G. J. Vaught,
Corn Planter.

No. 113,819. Patented Apr. 18, 1871.

Witnesses:
Wm. H. C. Smith.
P. E. Martin

Inventor:
G. J. Vaught.
PER
Attorneys.

United States Patent Office.

GRANVILLE J. VAUGHT, OF HANLY, KENTUCKY.

Letters Patent No. 113,819, dated April 18, 1871.

---

IMPROVEMENT IN CORN-PLANTERS.

---

The Schedule referred to in these Letters Patent and making part of the same.

---

*To all whom it may concern:*

Be it known that I, Rev. GRANVILLE J. VAUGHT, of Hanly, in the county of Jessamine and State of Kentucky, have invented a new and useful Improvement in Corn-Planter; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
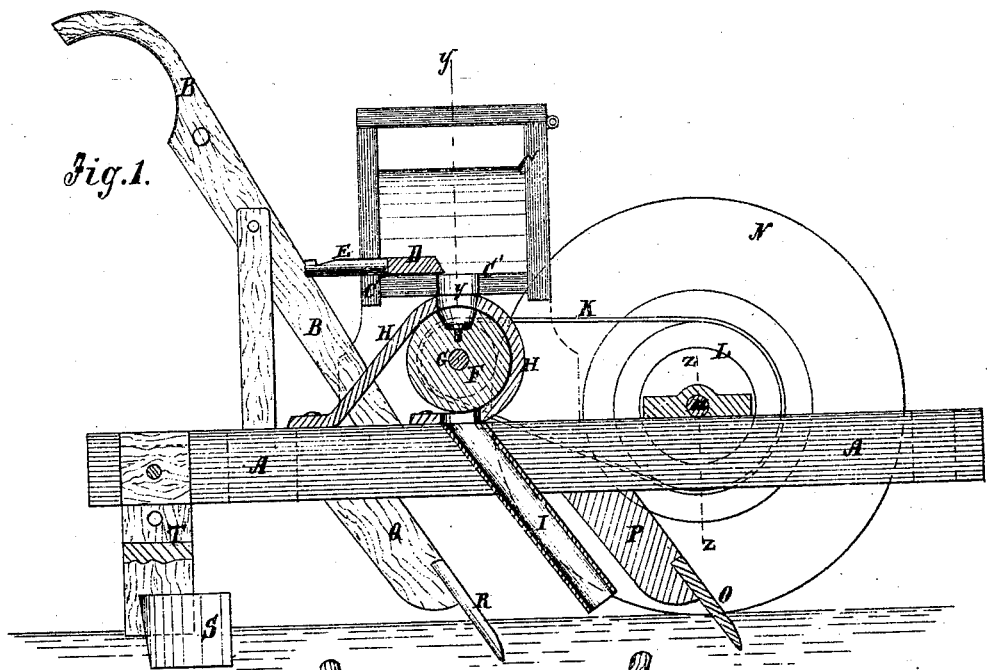
Figure 1 is a vertical longitudinal section of my improved machine taken through the line x x, fig. 2.
Figure 2:
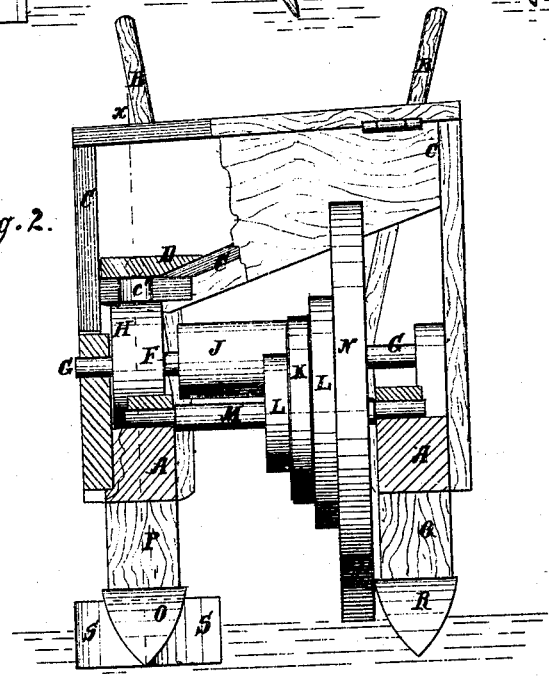
Figure 2 is a front view of the same, partly in section, through the lines y y and z z, fig. 1.

My invention has for its object to furnish an improved corn-planter, which shall be simple in construction and convenient, accurate, and reliable in operation, and which shall be so constructed as to furrow the ground, drop and cover the seed, and remove any clods that may be left upon the hills, leaving the seed uniformly covered to any desired depth; and It consists in the construction and combination of the various parts of the machine, as hereinafter more fully described.

A is the frame of the machine, which should be about four and a half feet long and nine inches wide, and to the rear part of which are attached the handles B, by which the planter is guided.

C is the seed-hopper, the side-boards of which project downward and are attached to the side bars of the frame A.

The bottom of the hopper is made inclined toward one side, and has a hole, c', formed through its lower part, through which the seed passes to the dropping-wheel.

D is a slide fitting and moving upon the lower part of the bottom of the hopper C, so that it may be adjusted to cover the egress-hole c' to prevent the escape of the seed when turning, or when passing from place to place.

The slide D is operated by a handle, E, passing out through a hole in the rear side of the hopper C, and projecting into such a position that it may be conveniently reached and operated by the driver.

F is the dropping-wheel, which is attached to a shaft, G, the journals of which revolve in bearings attached to the frame A beneath the hopper C.

H is a guard passing around the lower, forward, and upper part of the dropping-wheel F, fitting into the space between the said wheel F and the bottom of the hopper C, and having a hole formed through its upper part corresponding with the egress-hole of the hopper C.

The guard H is designed to keep the seed in the cup or cavity of the dropping-wheel until the revolution of said wheel has brought said cavity directly over a hole in the lower part of the guard H, which hole communicates directly with the upper end of the conductor-spout or tube I, which conducts the seed into the furrow in the rear of the furrowing-plow.

The guard H I prefer to make of leather or other similar substance, to prevent it from injuring the seed.

The cavity or cup of the dropping-wheel F has a screw screwed into it in the bottom of its cavity or cup, so that, by turning the said screw out or in, the size of the said cavity may be decreased or increased, according as less or more seed may be required to be dropped for a hill.

To the shaft G is attached a drum or long pulley, around which passes a belt, K, which also passes around a cone-pulley, L, attached to the shaft M, so that, by adjusting the belt K upon the said cone-pulley L, the distance apart of the hills may be regulated at will.

The shaft M revolves in bearings attached to the forward part of the frame A, and to it is attached the drive-wheel N, which is made of such a size as to bear upon the surface of the ground, so that the dropping device may be operated by the advance of the machine.

O is the furrowing-plow, which is attached to the lower end of the standard P, the upper end of which is attached to the side bar of the frame A.

To the other side bar of the frame A, a little in the rear of the furrowing-plow and conductor-spout, is attached the standard Q of the covering-plow R, by which the furrow opened by the plow O is filled, and the seed covered.

S is a V-shaped scraper, which is attached to the lower end of the standard T, the upper end of which is attached to the side bar of the frame A, directly in line with the furrowing-plow O P and conductor-spout I, but in the rear of the covering-plow Q R.

The standard T is adjustably attached to the side bar of the frame A, so that it may be conveniently raised and lowered to adjust the scraper S to remove more or less of the soil above the seed, so as to leave the seed covered uniformly and to any desired depth.

The scraper S is also designed to remove any clods that may be left over the seeds by the action of the covering-plow Q R.

Having thus described my invention,

I claim as new and desire to secure by Letters Patent—

An improved corn-planter, consisting of the frame A, handles B, seed-hopper C, dropping-wheel F, guard H, shaft G, drum or long pulley J, belt K, cone-pulley L, shaft M, drive-wheel N, furrowing-plow O P, conductor-spout I, covering-plow Q R, and adjustable scraper S T, said parts being constructed, arranged, and operating substantially as herein shown and described, and for the purpose set forth.

GRANVILLE J. VAUGHT.

Witnesses:
 GEO. FAIN,
 DUDLEY AKIN.